US011252534B2

(12) United States Patent
Liu et al.

(10) Patent No.: US 11,252,534 B2
(45) Date of Patent: Feb. 15, 2022

(54) METHOD AND APPARATUS FOR IDENTIFYING TYPES OF USER GEOGRAPHICAL LOCATIONS

(71) Applicant: TENCENT TECHNOLOGY (SHENZHEN) COMPANY LIMITED, Shenzhen (CN)

(72) Inventors: Zhibin Liu, Shenzhen (CN); Pei Duan, Shenzhen (CN); Bo Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 251 days.

(21) Appl. No.: 15/981,978

(22) Filed: May 17, 2018

(65) Prior Publication Data

US 2018/0270616 A1 Sep. 20, 2018

Related U.S. Application Data

(63) Continuation of application No. PCT/CN2017/087721, filed on Jun. 9, 2017.

(30) Foreign Application Priority Data

Jun. 12, 2016 (CN) .......................... 201610410598.0

(51) Int. Cl.
*G06F 16/29* (2019.01)
*H04W 4/029* (2018.01)
(Continued)

(52) U.S. Cl.
CPC ............ *H04W 4/025* (2013.01); *G06F 16/29* (2019.01); *G06F 17/18* (2013.01); *H04W 4/021* (2013.01);
(Continued)

(58) Field of Classification Search
CPC ..... H04W 4/025; H04W 4/029; H04W 4/021; H04W 4/21; H04W 4/02; H04W 4/08;
(Continued)

(56) References Cited

U.S. PATENT DOCUMENTS 9,110,982 B1 8/2015 Welsh et al.
2007/0270169 A1 11/2007 Hampel et al.
(Continued)

FOREIGN PATENT DOCUMENTS

CN 103248723 A 8/2013
CN 103312755 A 9/2013
(Continued)

OTHER PUBLICATIONS

International Search Report dated Aug. 30, 2017 in PCT/CN2017/087721 with English translation.
(Continued)

*Primary Examiner* — Jess Whittington
*Assistant Examiner* — Terry C Buse
(74) *Attorney, Agent, or Firm* — Oblon, McClelland, Maier & Neustadt, L.L.P.

(57) ABSTRACT

Aspects of the disclosure provide a method of determining types of user geographical locations. A target geographical location corresponding to a plurality of uploading times can be obtained. At least one time-location type mapping relationship table can be obtained. Based on the obtained at least one time-location type mapping relationship table, for each of location types in the at least one time-relation type mapping relationship table, a sum of probability values of the respective location type can be calculated to obtain a degree that the target geographical location belongs to each of the location types. Each of the probability values corresponds to one of the uploading times of the target geographical location. Which of the location types corresponds to the
(Continued)

target geographical location can be determined according to the degrees that the target geographical location belongs to each of the location types.

18 Claims, 5 Drawing Sheets

(51) Int. Cl.
    *G06F 17/18*     (2006.01)
    *H04W 4/02*     (2018.01)
    *H04W 4/021*     (2018.01)
    *H04L 29/08*     (2006.01)
    *H04W 4/21*     (2018.01)

(52) U.S. Cl.
    CPC ............. *H04W 4/029* (2018.02); *H04L 67/18* (2013.01); *H04W 4/02* (2013.01); *H04W 4/21* (2018.02)

(58) Field of Classification Search
    CPC ......... G06F 16/29; G06F 17/18; H04L 67/18; G01S 2205/008; G05D 1/0278
    USPC .......................................................... 701/408
    See application file for complete search history.

(56) References Cited

U.S. PATENT DOCUMENTS

| | | | |
|---|---|---|---|
| 2011/0167073 A1* | 7/2011 | Rosenberg | G06F 16/2474 707/752 |
| 2014/0221013 A1* | 8/2014 | Vaccari | G01S 5/02 455/456.3 |
| 2014/0222570 A1* | 8/2014 | Devolites | G06Q 30/0261 705/14.58 |
| 2015/0161439 A1* | 6/2015 | Krumm | G06T 11/00 382/113 |
| 2015/0245173 A1 | 8/2015 | Li et al. | |
| 2018/0233032 A1* | 8/2018 | Colonna | G08G 1/0129 |

FOREIGN PATENT DOCUMENTS

| | | | |
|---|---|---|---|
| CN | 103729387 A | 4/2014 | |
| CN | 103905978 A | 7/2014 | |
| CN | 103942853 A | 7/2014 | |
| CN | 104796858 A | 7/2015 | |
| CN | 105357638 A | 2/2016 | |
| CN | 106101224 A | 11/2016 | |
| JP | 2011-198292 | 10/2011 | |
| JP | 2015-82137 | 4/2015 | |
| WO | WO 2009/151925 | 12/2009 | |
| WO | WO 2011/071129 | 6/2011 | |
| WO | WO 2014/161345 | 10/2014 | |
| WO | WO-2014161345 A1 * | 10/2014 | ............ H04W 4/029 |

OTHER PUBLICATIONS

Chinese Office Action dated May 5, 2017 in Application No. 201610410598.0 with concise English translation.
Chinese Office Action dated Jul. 4, 2017 in Application No. 201610410598.0 with concise English translation.
Chinese Office Action dated Oct. 23, 2017 in Application No. 201610410598.0 with concise English translation.
Chinese Office Action dated Jan. 8, 2019 in Application No. 201610410598.0 with concise English translation.
Korean Office Action dated Nov. 25, 2019 in Korean Application No. 10-2018-7022746, 5 pages.
International Preliminary Report on Patentability dated Dec. 18, 2018 in PCT/CN2017/087721 with concise English translation.
Written Opinion of the International Searching Authority in PCT/CN2017/087721 dated Aug. 30, 2017 with concise English translation.
Japanese Office Action dated Jul. 29, 2019 in Application No. 2018-542148, with concise English translation.
Extended European Search Report dated May 15, 2019 in Application No. 17812634.8.

* cited by examiner

| Hour | Probability distribution at a residence | | Probability distribution at a working place |
|---|---|---|---|
| 0 | 0.09 | Rest | 0.01 |
| 1 | 0.09 | | 0.009 |
| 2 | 0.09 | | 0.008 |
| 3 | 0.09 | | 0.007 |
| 4 | 0.09 | | 0.006 |
| 5 | 0.09 | | 0.01 |
| 6 | 0.03 | Breakfast | 0.03 |
| 7 | 0.015 | Working hours | 0.07 |
| 8 | 0.01 | | 0.09 |
| 9 | 0.01 | | 0.09 |
| 10 | 0.01 | | 0.09 |
| 11 | 0.025 | Lunch | 0.025 |
| 12 | 0.02 | | 0.02 |
| 13 | 0.009 | Working hours | 0.09 |
| 14 | 0.007 | | 0.09 |
| 15 | 0.009 | | 0.09 |
| 16 | 0.01 | | 0.09 |
| 17 | 0.015 | | 0.05 |
| 18 | 0.025 | Dinner | 0.025 |
| 19 | 0.025 | Rest | 0.04 |
| 20 | 0.04 | | 0.025 |
| 21 | 0.05 | | 0.015 |
| 22 | 0.06 | | 0.01 |
| 23 | 0.09 | | 0.01 |
| | 1 | | 1 |

FIG. 3

METHOD AND APPARATUS FOR IDENTIFYING TYPES OF USER GEOGRAPHICAL LOCATIONS

RELATED APPLICATION

This application is a continuation of International Application No. PCT/CN2017/087721 filed on Jun. 9, 2017, which claims priority to Chinese Patent Application No. 201610410598.0 filed with the Chinese Patent Office on Jun. 12, 2016, and entitled "METHOD AND APPARATUS FOR IDENTIFYING TYPES OF USER GEOGRAPHICAL LOCATIONS". The entire disclosures of the prior applications are hereby incorporated by reference in their entirety.

FIELD OF THE TECHNOLOGY

This application relates to the field of computer technologies.

BACKGROUND OF THE DISCLOSURE

With the development of Internet technologies, Internet platforms and applications based on location based service (LBS) becomes more common. In the applications, a handheld device of a user usually is configured with a Global Positioning System (GPS) apparatus The handheld device obtains a geographical location (e.g., latitude and longitude information of a user location) of the user by using GPS equipment and uploads it to a server, and then the server provides a corresponding push service according to the geographical location of the user.

SUMMARY

Aspects of the disclosure provide a method of determining types of user geographical locations. A target geographical location corresponding to a plurality of uploading times can be obtained. At least one time-location type mapping relationship table can be obtained. The at least one time-location type mapping relationship table includes time intervals and location types, and defines probability values for each of the time intervals and the location types. Based on the obtained at least one time-location type mapping relationship table, for each of the location types in the at least one time-relation type mapping relationship table, a sum of the probability values of the respective location type can be calculated to obtain a degree that the target geographical location belongs to each of the location types. Each of the probability values corresponds to one of the uploading times of the target geographical location. Which of the location types corresponds to the target geographical location can be determined according to the degrees that the target geographical location belongs to each of the location types.

Aspects of the disclosure provide an information processing apparatus. The information processing apparatus can include circuitry configured to obtain a target geographical location corresponding to a plurality of uploading times. The circuitry is configured to obtain at least one time-location type mapping relationship table. The at least one time-location type mapping relationship table includes time intervals and location types, and defines probability values for each of the time intervals and the location types. The circuitry is configured to, based on the obtained at least one time-location type mapping relationship table, calculate, for each of the location types in the at least one time-relation type mapping relationship table, a sum of the probability values of the respective location type to obtain a degree that the target geographical location belongs to each of the location types. Each of the probability values corresponds to one of the uploading times of the target geographical location. The circuitry is configured to determine which of the location types corresponds to the target geographical location according to the degrees that the target geographical location belongs to each of the location types.

Aspects of the disclosure provide a non-transitory computer-readable medium storing a program executable by a processor to perform the method of determining types of user geographical locations.

BRIEF DESCRIPTION OF THE DRAWINGS

To describe the technical solutions in the embodiments of this application, the following briefly describes the accompanying drawings required for describing the embodiments. The accompanying drawings in the following description show merely some embodiments of this application, and a person of ordinary skill in the art may still derive other drawings from these accompanying drawings.

FIG. 3 is a schematic diagram of an inappropriate time-location type mapping relationship in an embodiment;

DESCRIPTION OF EMBODIMENTS

The following describes the technical solutions in embodiments of this application with reference to the accompanying drawings in the embodiments of this application. The described embodiments are some embodiments of this application rather than all of the embodiments. All other embodiments obtained by a person skilled in the art based on the embodiments of this application shall fall within the protection scope of this application.

An embodiment of this application provides a method for identifying a type of a geographical location of a user. A computer program may implement the method, and the computer program may run in a computer system based on Von Neumann Architecture. In some examples, the computer program may be a server program of an instant messaging application, a social network application or an O2O (online to offline) application providing an LBS service, and the like. In some examples, the computer system for performing the method may be a server device for running the server program of the instant messaging application, the social network application or the O2O application.

In an application scenario of this method, a user terminal may be configured with a GPS apparatus, to detect a geographical location of the user terminal in real time. The user terminal further installs a client of an instant messaging application, a social network application or an O2O application, and those applications are based on the LBS service. The server can be configured with multiple location types, for example, residence, work place, and recreation area, and a table of a time-location type mapping relationship. For a geographical location uploaded by the user terminal, uploading time is obtained and the mapping table is queried to identify a type of the geographical location of the user.

Figure 1:
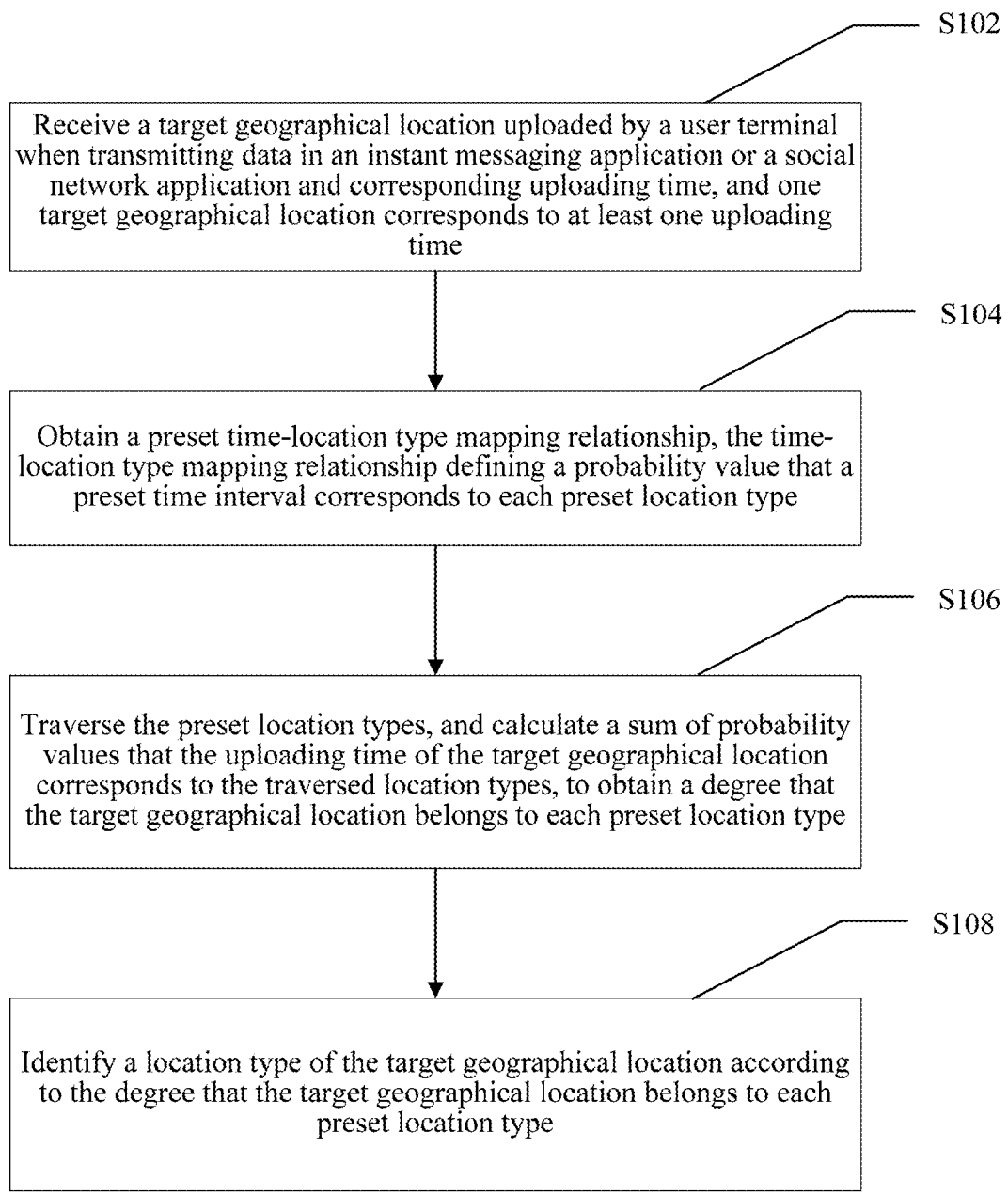
FIG. 1 is a schematic flowchart of a method for identifying a type of a geographical location of a user in an embodiment.

For example, as shown in FIG. 1, the method for identifying a type of a geographical location of a user includes:

Step S102: Receive a target geographical location uploaded by a user terminal when the user terminal transmits data with an application (e.g., instant messaging application or a social network application) and corresponding uploading time, and one target geographical location corresponds to at least one uploading time.

The server collecting a geographical location is realized by detecting that the user terminal transmits data with the instant messaging application or the social network application. The user terminal may upload the geographical location of the user terminal when the user uploads user generated content. For example, when the user sends a message to another user by using the user terminal, or uploads a photograph, or uploads a video to the server, the user terminal may attach the geographical location obtained by using a GPS chip to uploaded data. In another example, when the user performs a payment by using a mobile terminal, the mobile terminal may upload the geographical location of the user to the server.

In this embodiment, when the user takes an activity in a small range during a long time period, multiple geographical locations are uploaded, and the server may receive the multiple geographical locations uploaded by the user terminal when the user terminal transmits data in the instant messaging application or the social network application. The server may cluster the multiple geographical locations to obtain a target geographical location, and uploading time of the target geographical location can include the uploading times of the multiple geographical locations.

Figure 2:
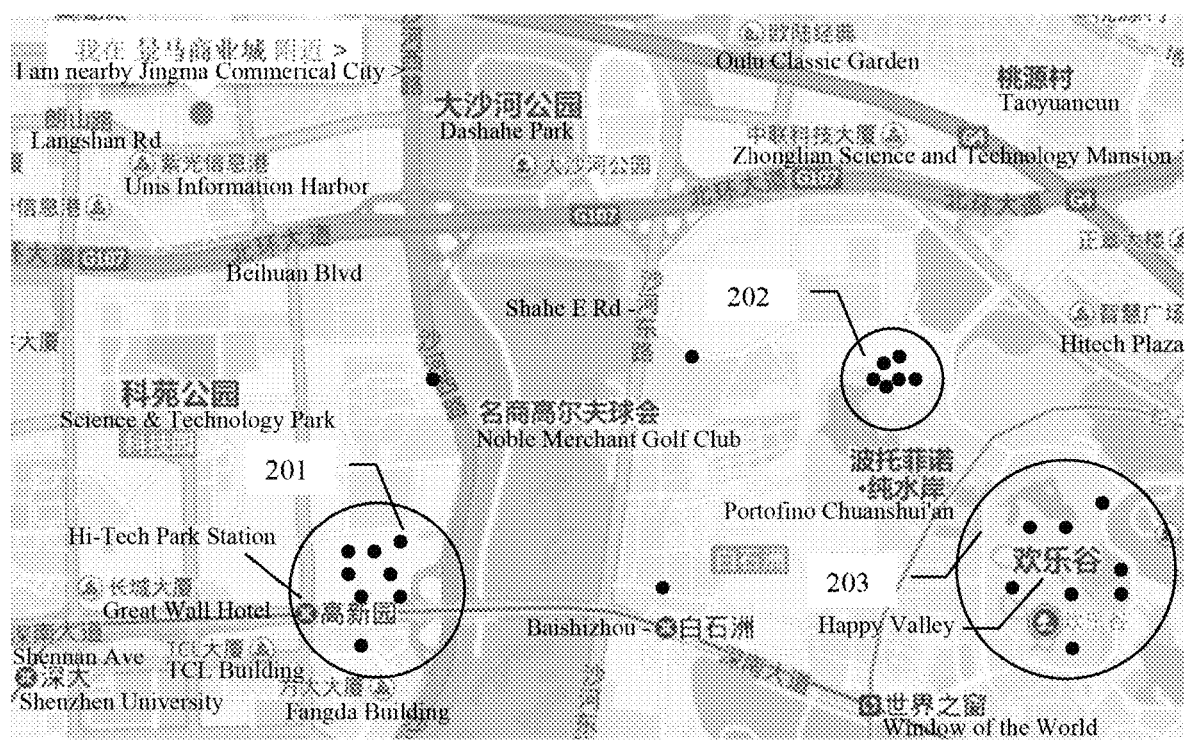
FIG. 2 is a schematic diagram of a distribution of a geographical location in an embodiment.

For example, if the user lives at a location. During the past month or year, the user may transmit data for multiple times. As the user may go around his or her home from time to time (e.g., walking a dog), the transmissions may be associated with multiple different locations. In other words, the user uploads multiple geographical locations to the server, and the geographical locations each correspond to an independent uploading time and possibly a different location. However, for the server, a position of a target geographical location need not to be accurately represented with a latitude coordinate and a longitude coordinate, and an area can be used to represent the target geographical location. To do that, the uploaded multiple geographical locations within one area may be clustered. For example, as shown in FIG. 2, a clustering may be performed according to a dense degree of uploaded geographical locations, and a location area (e.g., indicated by one of the circles 201/203/203 on the map in FIG. 2) obtained by the clustering is used as a target geographical location. However, all uploading times of the clustered geographical locations are still reserved, that is, the uploading times corresponding to the uploaded geographical locations within the area are set as the uploading times of the target geographical location, that is, the target geographical location and the uploading times may be a relationship of one to more, and a physical meaning is that the user stays in an area for enough long time and uploads the target geographical locations for multiple times.

Step S104: Obtain a preset time-location type mapping relationship, the time-location type mapping relationship defining a probability value associated with each preset location type during a preset time interval.

The server defines multiple location types in advance, for example: residence, work place, and recreation area.

The server further defines multiple time intervals in advance, for example: 0 o'clock to 6 o'clock, and 6 o'clock to 9 o'clock.

Corresponding to each time interval, each preset location type has a probability value indicating a probability of an average user staying at a place of the respective location type. For example, during a time interval of 0 o'clock to 6 o'clock, a probability value under a "residence" location type may be set to A, a probability value under a "work place" location type may be set to B, and a probability value under a "recreation area" location type may be set to C.

As shown in Table 1, Table 1 represents a mapping table of the time-location type mapping relationship in workdays in an embodiment.

TABLE 1

| Time interval | Probability at residence | Probability at work place | Probability at recreation area |
|---|---|---|---|
| 0-6 | 0.7 | 0.1 | 0.2 |
| 6-9 | 0.35 | 0.35 | 0.3 |
| 9-12 | 0.2 | 0.7 | 0.1 |
| 12-14 | 0.2 | 0.2 | 0.6 |
| 14-18 | 0.2 | 0.7 | 0.1 |
| 18-21 | 0.2 | 0.2 | 0.6 |
| 21-24 | 0.6 | 0.1 | 0.3 |

It should be noted that, the table is just used as an example for representing a mapping relationship between a preset time period and each preset location type and a mapping probability value thereof, and in various embodiments, the server does not need the completely same table as herein. The mapping relationship may be stored in multiple data structures.

As can be seen from Table 1, in a pre-stored time-location type mapping relationship on the server, multiple time intervals are divided in advance, such as the time intervals of 0-6, 6-9, and 9-12, and in each time interval, each location type corresponds to a probability value. For example, during a time interval of 0-6, a probability at a residence is 0.7, a probability at a work place is 0.1, and a probability at a recreation area is 0.2. This means that, during the time interval from 0 o'clock to 6 o'clock in the morning, it has a large probability (a probability of 70%) that the user takes a rest at the residence, a small probability of working overtime (a probability of 10%) at the work place or playing at the recreation area (a probability of 20%).

It should be noted that, the preset time-location type mapping relationship further needs to satisfy the following conditions:

1. A sum of probability values corresponding to a same time interval t under each preset location type by a user is 1, that is:

$$P(\text{user at residence}|T=t)+P(\text{user at working place}|T=t)+P(\text{user at recreation area}|T=t)=1$$

This means that, the user may just exist in one of all the preset location types at the same time, that is, the user is at the residence, or at the work place, or at the recreation area, and cannot exist in two places at the same time or vanish into thin air.

2. A sum of probability values corresponding to a same location type in each time interval is not 1, that is:

$$\sum_{i=1}^{m} P(\text{user at residence} | T = t_i) \neq 1$$

This means that, the user is impossible to be existed in a same place during all the time, in the case in which the time-location type mapping relationship becomes meaningless.

As shown in FIG. 3, FIG. 3 represents a time-location type mapping relationship that is incorrectly designed. Sums of the so-called "probability at residence" and "probability at work place" in the figure both equal to 1 on time.

Optionally, the time-location type mapping relationship stored on the server may not be unique, and different time-location type mapping relationships may be designed according to different users in advance. That is, the server may obtain an account type of a user account used by the user terminal for login in the instant messaging application or the social network application; and obtain a preset time-location type mapping relationship corresponding to the account type.

For example, a timetable of a user on a day shift (work during 9 o'clock to 17 o'clock) and that of a user on a night shift (work during 22 o'clock to 6 o'clock in the early morning the next day) are different. Therefore, in the 0-6 time period, in the time-location type mapping relationship corresponding to the user on a day shift, the probability at the residence is relatively great, while in the time-location type mapping relationship corresponding to the user on a night shift, the probability at the work place is relatively great, when the time-location type mapping relationship is designed. In this way, a relatively real probability may be demonstrated, so as to make an identification more accurate.

Moreover, the server may further obtain a preset time period (e.g., workday or holiday) corresponding to the uploading time, and obtain the preset time-location type mapping relationship that corresponds to the time period corresponding to the uploading time.

For example, in workdays or on holidays, the living habits and customs of a user are different, so that during a same time interval, a probability of the residence, the work place or the recreation area needs to be designed as different. Referring to Table 2, Table 2 represents a mapping table of the time-location type mapping relationship on holidays in an embodiment.

It should be noted that, the table is just used as an example, for representing a mapping relationship between a preset time period and each preset location type and a mapping probability value thereof, and in various embodiments, the server does not need the completely same table as herein. The mapping relationship may store in multiple data structures.

TABLE 2

| Time interval | Probability at residence | Probability at work place | Probability at recreation area |
|---|---|---|---|
| 0-9 | 0.68 | 0.02 | 0.3 |
| 9-12 | 0.5 | 0.1 | 0.4 |
| 12-14 | 0.4 | 0.05 | 0.55 |
| 14-18 | 0.3 | 0.1 | 0.6 |
| 18-21 | 0.4 | 0.02 | 0.58 |
| 21-24 | 0.5 | 0.05 | 0.45 |

It can be seen from a comparison of Table 1 and Table 2, during a time interval of 14-18, it has a relatively great probability (a probability of 70%) that a user is at a work place in workdays, while holidays, it has a relatively great probability (a probability of 60%) that the user is at a recreation area.

The server uses different time-location type mapping relationships for different time periods (such as a weekday and a holiday), to make a probability of a location type more consistent with user habits, so as to make the identification more accurate.

Step S106: Traverse the preset location types, and calculate a sum of probability values of each location type corresponding to uploading times of the target geographical location, to obtain a degree of the target geographical location belonging to a preset location type for each respective preset location type.

For example, in a scenario on holidays as shown in Table 2, a degree of the target geographical location L under the location type of residence is:

$$S(L \text{ is residence}) = \sum_{j=1}^{n} P(\text{user at residence} | T = t_j)$$

A degree of the target geographical location L under the location type of work place is:

$$S(L \text{ is working place}) = \sum_{j=1}^{n} P(\text{user at working place} | T = t_j)$$

A degree of the target geographical location L under the location type of recreation area is:

$$S(L \text{ is recreation area}) = \sum_{j=1}^{n} P(\text{user at recreation area} | T = t_j)$$

where n is a total number of the uploading times of the target geographical location L, j is a sequence number of the uploading times, and $t_j$ is an uploading time. For example, during a past time period (e.g., 7 days, 30 days, 365 days), n number of workday uploading times are obtained corresponding to a target geographical location.

Step S108: Identify a location type of the target geographical location according to the degree that the target geographical location belongs to each preset location type.

In this embodiment, under a condition with sufficient samples, that is, when a quantity of the uploading time corresponding to the target geographical location is greater than or equal to a threshold, a probability of the target geographical location belonging to each preset location type may be obtained by a statistical method, and for example:

A sum of degrees of the target geographical location belonging to each preset location type is calculated and a ratio of the degree that the target geographical location belongs to each preset location type to the sum of the degrees is calculated, when a quantity of the uploading time corresponding to the target geographical location is greater than or equal to a threshold, to obtain a probability of the target geographical location belonging to each preset location type. The location type of the target geographical location is identified according to the probability of the target geographical location belonging to each preset location type.

For example, a probability of the target geographical location L under the location type of residence is:

$$P(L \text{ is residence}) = \frac{S(L \text{ is residence})}{S(L \text{ is residence}) + S(L \text{ is working place}) + S(L \text{ is recreation area})}$$

A probability of the target geographical location L under the location type of work place is:

$$P(L \text{ is working place}) = \frac{S(L \text{ is working place})}{S(L \text{ is residence}) + S(L \text{ is working place}) + S(L \text{ is recreation area})}$$

A probability of the target geographical location L under the location type of recreation area is:

$$P(L \text{ is recreation area}) = \frac{S(L \text{ is recreation area})}{S(L \text{ is residence}) + S(L \text{ is working place}) + S(L \text{ is recreation area})}$$

In this case, a location type that has a greatest probability may be selected as the location type of the target geographical location in P (L is residence), P (L is work place) and P (L is recreation area). And if the probabilities of the three are similar, a user may be prompted to perform an annotation (selection) manually.

Because a sample quantity is relatively small, when a quantity of the uploading times corresponding to the target geographical location is less than a threshold, reliability of the foregoing method is insufficient. Therefore, a ratio of the degree that the target geographical location belongs to each preset location type and a sum of probabilities under the respective location types may be calculated, and the location type of the target geographical location may be identified according to the ratio.

For example, a ratio of the degree under the location type of residence to a sum of probabilities under the location type of residence of the target geographical location L is:

$$R(L \text{ is residence}) = \frac{S(L \text{ is residence})}{\sum_{i=1}^{m} P(\text{user at residence} \mid T = t_i)}$$

where m is a quantity of all time intervals in a time-location type mapping table, i is a sequence number of all preset time intervals, and $t_i$ is a time interval. As shown in Table 2, that is a sum of probability values of a column that the "probability at residence" is in.

A ratio of the degree under the location type of work place to a sum of probabilities under the location type of work place of the target geographical location L is:

$$R(L \text{ is working place}) = \frac{S(L \text{ is working place})}{\sum_{i=1}^{m} P(\text{user at working place} \mid T = t_i)}$$

A ratio of the degree under the location type of recreation area to a sum of probabilities under the location type of recreation area of the target geographical location L is:

$$R(L \text{ is recreation area}) = \frac{S(L \text{ is recreation area})}{\sum_{i=1}^{m} P(\text{user at recreation area} \mid T = t_i)}$$

In this case, a location type that corresponds to a greatest ratio greater than a threshold may be selected as the location type of the target geographical location in R (L is residence), R (L is work place) and R (L is recreation area). In addition, if proportions of the three are similar, or the greatest proportion value is less than the threshold, the user may be prompted to perform an annotation manually.

Further, after identifying the location type of the target geographical location according to the degree that the target geographical location belongs to each preset location type, the server may further detect a current geographical location of the user terminal, search a location type of the current geographical location uploaded by the user terminal, and select data content corresponding to the location type to push to the user terminal.

For example, when the target geographical location L is identified as a recreation area, and a user is located at the target geographical location L, if the server detects a current location of the user, it can be identified that the user is in the recreation area currently. In this case, some shopping guide information, discounts or advertisement information being applicable to this case may be pushed to the user. In this way, the content pushed by the server can be more related with an environment the user is currently in, so that the content pushing can be performed more accurately.

Further, after identifying the location type of the target geographical location according to the degree that the target geographical location belongs to each preset location type, the server may calculate a distribution of the geographical location belonging to each preset location type; obtain a user account used by the user terminal for login in the instant messaging application or the social network application; and determine a credit rating of the user account according to the distribution of the geographical location belonging to the location type.

For example, if the target geographical location L1 is identified as a residence of a user and is in a central business district (CBD for short), because it can be known from data acquired from Internet that property values are relatively high in the target geographical location L1, a server of a credit investigation system may determine that the user has a house property in the CBD and accordingly assigns a relatively high credit rating to the user. Correspondingly, if multiple target geographical locations are all identified as residences of the user, the server of the credit investigation system may determine that the user may have multiple house properties and may be endowed a relatively high credit rating. And if the target geographical location L1 is identified as a work place of the user and the location is remote, and a L2 around which the house price is relatively low is identified as a residence of the user, the server of the credit investigation system may determine that the user is just an employee working in the CBD and house value of residence of which is relatively low, so that the user is just be endowed a relatively low credit rating.

The foregoing credit rating setting manner with reference to a type of a geographical location of the user, compared with, in the conventional technology, a manner that is mainly based on data of a bank statement and a credit history of the user, to establish the credit investigation system that a scoring model endows a quantization score for a "credit" of the user, uses a passive behavior record and activity record of the user to determine an actual economic strength of the user. Thus, the user can be prevented from fabricating data (for example, by depositing large amounts of money in and out during a short time to make a false appearance of a relatively high bank statement) as in the conventional credit investigation system resulting in a more accurate credit rating.

It should be noted that, the foregoing method may process geographical location data flow obtained continuously in real time, and may run on a server end after being written into independent application software or a dedicated module in a massive software system by using a programming language C/C++, Java or the like. The foregoing method can comprehensively employ original geographical location data or processed intermediate data of all the levels or a final result received from one or more mobile clients of one or more users, in combination with historical data, to obtain an updated result. and then output it to another application program or module for using in real time or non-real time. Alternatively, the result may be written into a database or file of the server end for storing.

The foregoing method may further be implemented on a distributed and paralleled calculation platform constituted by multiple servers, and be attached a customized and easily interactive Web interface or various other UI interfaces, to form a "geographical location data mining platform" for a person, a group or an enterprise to use. A user may upload existing data packets to the "geographical location data mining platform" in batches to obtain a type determining result, and may transmit real-time data flow to the "geographical location data mining platform" to calculate and refresh a type identification result.

Figure 4:
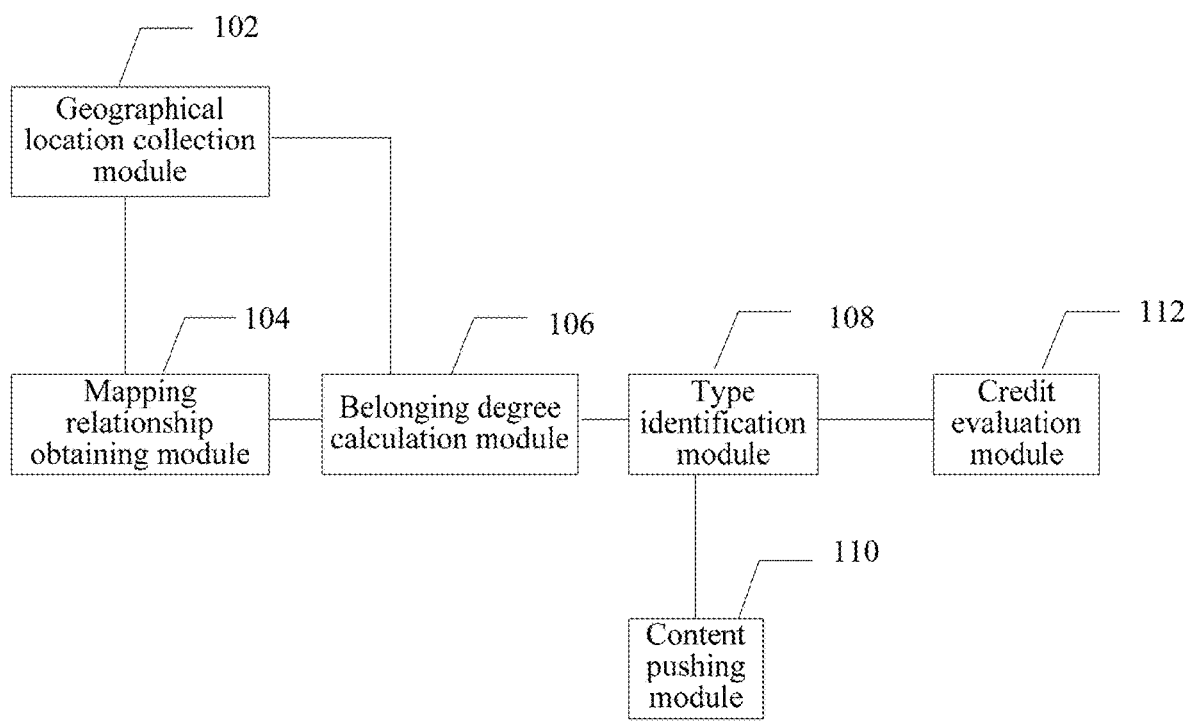
FIG. 4 is a schematic structural diagram of an apparatus for identifying a type of a geographical location of a user in an embodiment.

An apparatus for identifying a type of a geographical location of a user is further provided in an embodiment of this application. As shown in FIG. 4, the foregoing apparatus for identifying a type of a geographical location of a user includes a geographical location collection module 102, a mapping relationship obtaining module 104, a belonging degree calculation module 106 and a type identification module 108, where:

a geographical location collection module 102 is configured to receive a target geographical location uploaded by a user terminal when the user terminal transmits data in an instant messaging application or a social network application and corresponding uploading time, and one target geographical location corresponds to at least one uploading time;

a mapping relationship obtaining module 104 is configured to obtain a preset time-location type mapping relationship, the time-location type mapping relationship defining a probability value that a preset time interval corresponds to each preset location type;

a belonging degree calculation module 106 is configured to traverse the preset location types, and calculates a sum of probability values that the uploading time of the target geographical location corresponds to the traversed location types, to obtain a degree that the target geographical location belongs to each preset location type; and a type identification module 108 is configured to identify a location type of the target geographical location according to the degree that the target geographical location belongs to each preset location type.

Optionally, in an embodiment, the geographical location collection module 102 is further configured to receive at least one geographical location uploaded by a user terminal when the user terminal transmits data in an instant messaging application or a social network application, and cluster the at least one geographical location to obtain the target geographical location, where uploading time of the target geographical location is respective uploading time of the at least one geographical location.

Optionally, in an embodiment, the mapping relationship obtaining module 104 is further configured to obtain an account type of a user account used by the user terminal for login in the instant messaging application or the social network application; and obtain a preset time-location type mapping relationship corresponding to the account type.

Optionally, in an embodiment, the mapping relationship obtaining module 104 is further configured to obtain a preset time period corresponding to the uploading time, and obtain the preset time-location type mapping relationship that corresponds to the time period corresponding to the uploading time.

Optionally, in an embodiment, where in the preset time-location type mapping relationship: a sum of probability values corresponding to a same time interval under each preset location type is 1; and a sum of probability values corresponding to a same location type in each time interval is not 1.

Optionally, in an embodiment, the type identification module 108 is further configured to calculate a sum of degrees of the target geographical location belonging to each preset location type and calculate a ratio of the degree that the target geographical location belongs to each preset location type to the sum of the degrees, when a quantity of the uploading time corresponding to the target geographical location is greater than or equal to a threshold, to obtain a probability of the target geographical location belonging to each preset location type, and identify the location type of the target geographical location according to the probability of the target geographical location belonging to each preset location type.

Optionally, in an embodiment, the type identification module 108 is further configured to calculate a ratio of the degree that the target geographical location belongs to each preset location type and a sum of probabilities under the respective location types, when a quantity of the uploading time corresponding to the target geographical location is less than a threshold, and identify the location type of the target geographical location according to the ratio.

Optionally, in an embodiment, as shown in FIG. 4, the foregoing apparatus further includes a content pushing module 110, being configured to detect the geographical location of the user terminal, search a location type of the geographical location uploaded by the user terminal, and select data content corresponding to the location type to push to the user terminal.

Optionally, in an embodiment, as shown in FIG. 4, the foregoing apparatus further includes a credit evaluation module 112, being configured to calculate a distribution of the geographical location belonging to each preset location type, obtain a user account used by the user terminal for login in the instant messaging application or the social network application; and determine a credit rating of the user account according to the distribution of the geographical location belonging to the location type.

By implementing the embodiments of this application, the following beneficial effects are obtained:

In the foregoing method and apparatus for identifying a type of a geographical location of a user, because daily activities of the user are regular, a probability that the user locates on a place of a specific location type during a time interval may also has certain regularity. Therefore, the server presets a time-location type mapping relationship, and the time-location type mapping relationship defines a probability value that a preset time interval corresponds to each preset location type. The server may search the degree of the target geographical location belongs to each location type from the foregoing mapping relationship according to the uploading time of the target geographical location, so that the server may identify the type of the geographical location of the user according to the degree. The type of the geographical location of the user is identified in this manner, and an adopted basis of which is an activity record generated passively by the user when using an instant messaging application or a social network application. Therefore, no fabricated ingredient exists and the identification manner is based on objective regularity of a daily life of a user. Therefore, accuracy of the identification is relatively high.

Figure 5:
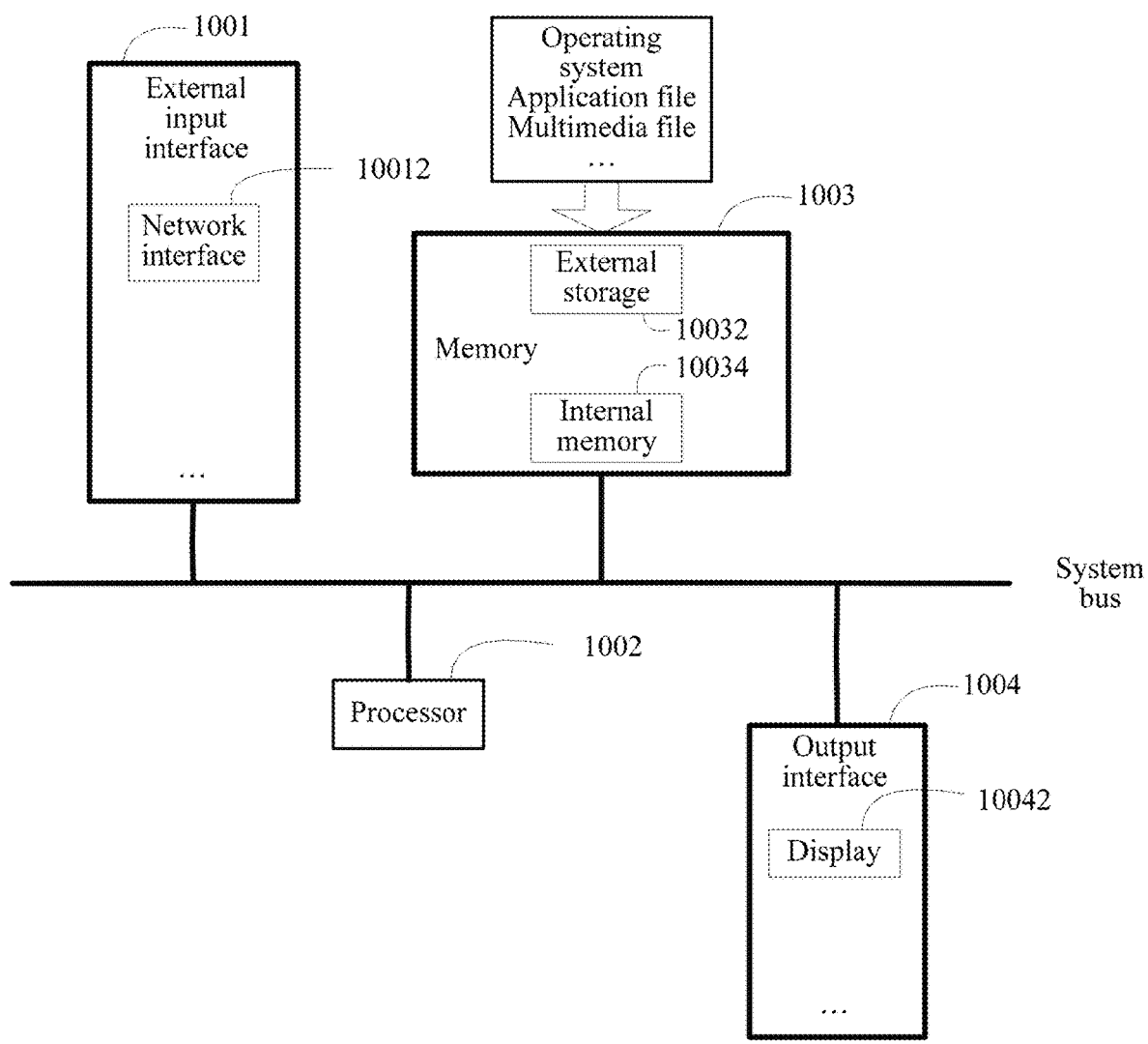
FIG. 5 is a schematic structural diagram of a computer device for performing the method of identifying a type of a geographical location of a user in an embodiment.

In an embodiment, as shown in FIG. 5, FIG. 5 represents a terminal 10 of a computer system based on Von Neumann Architecture for performing the foregoing method for identifying a type of a geographical location of a user. The computer system may be a terminal device, such as a smart phone, a tablet computer, a handheld computer, a notebook computer or a personal computer. Specifically, an external input interface 1001, processing circuitry such as a processor 1002, a memory 1003 and an output interface 1004 that are connected by a system bus may be included. The external input interface 1001 may optionally at least include a network interface 10012. The memory 1003 may include an external storage 10032 (such as a hard disk, an optical disc or a floppy disk) and an internal memory 10034. The output interface 1004 may at least include a device, such as a display screen 10042.

In this embodiment, this method is performed basing on computer program. A program file of the computer program is stored in a non-transitory computer-readable medium such as the foregoing external storage 10032 of the computer system 10 based on Von Neumann Architecture and is loaded to the memory 10034 when running, and is transferred to the processor 1002 for executing after being compiled to machine code, so that a geographical location collection module 102, a mapping relationship obtaining module 104, a belonging degree calculation module 106 and a type identification module 108 are formed logically in the computer system 10 based on Von Neumann Architecture. In addition, during the foregoing method performing process for identifying a type of a geographical location of a use, input parameters are received through the external input interface 1001, and are transferred to the memory 1003 for cache, and then inputted to the processor 1002 to be processed, processed result data is cached and stored in the memory 1003 to be processed subsequently, or transferred to the output interface 1004 to be outputted.

What is disclosed above are merely examples of the embodiments of this application, and certainly is not intended to limit the protection scope of this application. Therefore, equivalent variations made in accordance with the claims of the present disclosure shall fall within the scope of this application.

What is claimed is:

1. A method, comprising:
    obtaining, by processing circuitry of an information processing apparatus, a target geographical location corresponding to a plurality of uploading times;
    obtaining, by the processing circuitry of the information processing apparatus, at least one time-location type mapping relationship table, the at least one time-location type mapping relationship table including (i) time intervals and location types, and (ii) predefined probability values for each of the time intervals and the location types, a sum of the predefined probability values corresponding to a same time interval under each of the location types in the at least one time-location type mapping relationship table is 1;
    based on the obtained at least one time-location type mapping relationship table, calculating, by the processing circuitry of the information processing apparatus, for each of the location types in the at least one time-location type mapping relationship table, a sum of the predefined probability values for each of the time intervals of the respective location type, the sum representing a determined degree that the target geographical location belongs to the respective location type, each of the predefined probability values corresponding to one of the plurality of uploading times of the target geographical location; and
    calculating, by the processing circuitry of the information processing apparatus, for each of the location types using the determined degree for the respective location type divided by a sum of each of the determined degrees, a probability that the target geographical location belongs to the respective location type.

2. The method according to claim 1, further comprising:
    obtaining geographical locations from data uploaded from an application executed on a user terminal; and
    clustering the obtained geographical locations to obtain the target geographical location that corresponds to an area including the obtained geographical locations corresponding to the plurality of uploading times.

3. The method according to claim 2, wherein the obtaining the time-location type mapping relationship table further comprises:
    obtaining an account type of a user account of the application executed on the user terminal; and
    obtaining the at least one time-location type mapping relationship table corresponding to the account type.

4. The method according to claim 2, further comprising:
    detecting a current geographical location of the user terminal; and
    determining the current geographical location as corresponding to the location type of the target geographical location when the current geographical location is within the area corresponding to the target geographical location.

5. The method according to claim 2, further comprising:
    obtaining a user account associated with the application executed on the user terminal; and
    assigning a rating to the user account according to a position and the location type of the target geographical location.

6. The method according to claim 1, wherein the obtaining the at least one time-location type mapping relationship table further comprises:
    determining a time period corresponding to each uploading time of the plurality of uploading times; and
    obtaining one of the at least one time-location type mapping relationship table that corresponds to the determined time period corresponding to each uploading time of the plurality of uploading times.

7. The method according to claim 1, wherein the calculating, for each of the location types using the determined degrees, the probability that the target geographical location belongs to the respective location type further includes:
calculating the sum of each of the determined degrees;
calculating, for each of the location types, a ratio of a degree that (i) the target geographical location belongs to the respective location type to (ii) the calculated sum of the determined degrees, the ratio indicating the probability that the target geographical location belongs to the respective location type; and
determining which of the location types corresponds to the target geographical location according to the calculated probability that the target geographical location belongs to the respective location type.

8. The method according to claim 1, wherein the calculating, for each of the location types using the determined degrees, the probability that the target geographical location belongs to the respective location type further includes:
calculating, for each of the location types, a ratio of a degree that (i) the target geographical location belongs to the respective location type to (ii) a sum of the predefined probability values of each of the time intervals under the respective location type in the at least one time-location type mapping relationship table; and
determining which of the location types corresponds to the target geographical location according to the ratios of each of the location types.

9. An information processing apparatus, comprising:
circuitry configured to:
obtain a target geographical location corresponding to a plurality of uploading times,
obtain at least one time-location type mapping relationship table, the at least one time-location type mapping relationship table including (i) time intervals and location types, and (ii) predefined probability values for each of the time intervals and the location types, a sum of the predefined probability values corresponding to a same time interval under each of the location types in the at least one time-location type mapping relationship table is 1,
based on the obtained at least one time-location type mapping relationship table, calculate for each of the location types in the at least one time-location type mapping relationship table, a sum of the predefined probability values for each of the time intervals of the respective location type, the sum representing a determined degree that the target geographical location belongs to the respective location type, each of the predefined probability values corresponding to one of the plurality of uploading times of the target geographical location, and
calculate, for each of the location types using the determined degree for the respective location type divided by a sum of each of the determined degrees, a probability that the target geographical location belongs to the respective location type.

10. The information processing apparatus according to claim 9, wherein the circuitry is further configured to:
obtain geographical locations from data uploaded from an application executed on a user terminal; and
cluster the obtained geographical locations to obtain the target geographical location that corresponds to an area including the obtained geographical locations corresponding to the uploading times.

11. The information processing apparatus according to claim 10, wherein the circuitry is further configured to:
obtain an account type of a user account of the application executed on the user terminal; and
obtain the at least one time-location type mapping relationship table corresponding to the account type.

12. The information processing apparatus according to claim 10, wherein the circuitry is further configured to:
detect a current geographical location of the user terminal; and
determine the current geographical location corresponds to the location type of the target geographical location when the current geographical location is within the area corresponding to the target geographical location.

13. The information processing apparatus according to claim 10, wherein the circuitry is further configured to:
obtain a user account associated with the application executed on the user terminal; and
assign a rating to the user account according to a position and the location type of the target geographical location.

14. The information processing apparatus according to claim 9, wherein the circuitry is further configured to:
determine a time period corresponding to each of the uploading times; and
obtain one of the at least one time-location type mapping relationship table that corresponds to the determined time period corresponding to each of the uploading times.

15. The information processing apparatus according to claim 9, wherein the circuitry is further configured to:
calculate the sum of each of the determined degrees;
calculate, for each of the location types, a ratio of a degree that (i) the target geographical location belongs to the respective location type to (ii) the calculated sum of the determined degrees, the ratio indicating the probability that the target geographical location belongs to the respective location type; and
determine which of the location types corresponds to the target geographical location according to the calculated probability that the target geographical location belongs to the respective location type.

16. The information processing apparatus according to claim 9, wherein the circuitry is further configured to:
calculate, for each of the location types, a ratio of a degree that (i) the target geographical location belongs to the respective location type to (ii) a sum of the predefined probability values of each of the time intervals under the respective location type in the at least one time-location type mapping relationship table; and
determine which of the location types corresponds to the target geographical location according to the ratios of each of the location types.

17. A non-transitory computer-readable medium storing a program executable by a processor to perform:
obtaining a target geographical location corresponding to a plurality of uploading times;
obtaining at least one time-location type mapping relationship table, the at least one time-location type mapping relationship table including (i) time intervals and location types, and (ii) predefined probability values for each of the time intervals and the location types, a sum of the predefined probability values corresponding to a same time interval under each of the location types in the at least one time-location type mapping relationship table is 1;

based on the obtained at least one time-location type mapping relationship table, calculating for each of the location types in the at least one time-location type mapping relationship table, a sum of the predefined probability values for each time interval of the respective location type, the sum representing a determined degree that the target geographical location belongs to the respective location type, each of the predefined probability values corresponding to one of the plurality of uploading times of the target geographical location; and calculating, for each of the location types using the determined degree for the respective location type divided by a sum of each of the determined degrees, a probability that the target geographical location belongs to the respective location type.

18. The non-transitory computer-readable medium according to claim 17, wherein the program is executable by the processor to perform:

obtaining geographical locations from data uploaded from an application executed on a user terminal; and clustering the obtained geographical locations to obtain the target geographical location that corresponds to an area including the obtained geographical locations corresponding to the uploading times.

\* \* \* \* \*